(No Model.)
J. HANSEN.
VEHICLE AXLE NUT.
No. 450,311. Patented Apr. 14, 1891.
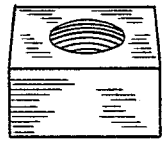
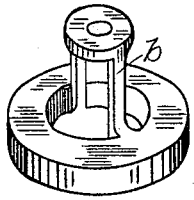
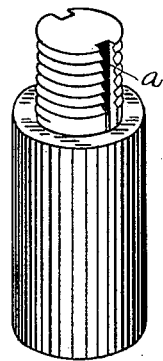
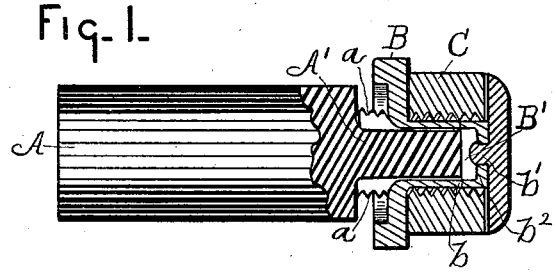
WITNESSES
F. Clough.
M. A. Reeve.
INVENTOR
Johan Hansen
By Wells W. Leggett
Attorneys.

UNITED STATES PATENT OFFICE.

JOHAN HANSEN, OF DETROIT, MICHIGAN, ASSIGNOR OF ONE-HALF TO JOHN EDWARD PATTERSON, OF SAME PLACE.

VEHICLE-AXLE NUT.

SPECIFICATION forming part of Letters Patent No. 450,311, dated April 14, 1891.

Application filed February 18, 1891. Serial No. 381,913. (No model.)

*To all whom it may concern:*

Be it known that I, JOHAN HANSEN, a citizen of the United States, residing at Detroit, county of Wayne, State of Michigan, have invented a certain new and useful Improvement in Anti-Loosening Nuts for Wheels; and I declare the following to be a full, clear, and exact description of the invention, such as will enable others skilled in the art to which it pertains to make and use the same, reference being had to the accompanying drawings, which form a part of this specification.

In the drawings, Figure 1 is a view, partly in section and partly in elevation, of an axle-spindle with my improvements applied thereto. Fig. 2 is a separate view of the end of the spindle. Fig. 3 is a separate view of the washer; Fig. 4, a separate view of the nut; and Fig. 5, a separate view of the retaining-head, whereby the nut is swiveled onto the shank of the washer.

It is well known that where a wheel is secured to a spindle—as, for instance, a vehicle-wheel to its axle—by a nut great annoyance is occasioned by the loosening of the said nut, especially when the vehicle is backed, or when the motion of the wheel is in the proper direction to run the nut off from the spindle. So, also, difficulty frequently arises, due to the fact that the friction of the wheel against the nut sometimes acts to run the nut farther onto the spindle, causing it to bind upon the wheel.

It is the purpose of my invention to produce a convenient construction which shall obviate both of these difficulties and enable a person to screw the nut to any desired position upon the spindle with the assurance that no action of the wheel thereon in either direction can disturb its position.

In carrying out my invention, A may represent the spindle of a vehicle-wheel, provided in the usual way with a screw-threaded extremity A' for the reception of the axle-nut.

B is a washer. It is provided with arms $b$, which set into and slide freely within corresponding grooves $a$ in the screw-threaded extremity A' of the spindle, so as to be wholly beneath the threads.

B' is a head secured to the arms $b$ in any convenient way—as, for instance, by passing a stem $b'$ through the cross-piece $b^2$ and riveting it thereto, or it might be fastened to the said cross-piece $b^2$ by a screw, or in any other convenient way.

C is the retaining-nut. It is slipped freely over the arms $b$ of the washer, and held in place thereon by the head B', thus swiveling the nut upon the washer, so that the washer will move on and off with the nut and the two unite, so as to be handled as a single piece.

The operation of the device is as follows: The wheel having been placed upon the spindle, the washer, with its nut, is passed on over the screw-threaded extremity A' in such position that the arms $b$ enter the grooves $a$. The nut is then run onto the threads and carries before it the washer B until it has been brought down to a proper bearing against the hub of the wheel. It is now apparent that the washer cannot be rotated in either direction about the axis of the spindle, and therefore no action of the wheel against the washer, whether in one direction or the other, can operate to either tighten or loosen the retaining-nut C.

In order to adapt this nut for use upon any ordinary axle-spindle, it is only necessary to cut the grooves $a$ in the said spindle, and I would have it understood that there may be one or more of the said grooves.

What I claim is—

1. The combination, with the threaded extremity A' of an axle, of one or more grooves $a$, a washer B, having arms engaged within said grooves, a nut C, swiveled over the arms of the washer, and means for holding the nut in its swiveled position on the said arms of the washer, substantially as and for the purposes described.

2. The combination, with a washer B, having arms $b$, of a nut C, swiveled upon said arms, the outer extremity of said arms provided with means for holding the nut in place upon the arms, the whole adapted to be used upon a threaded spindle having grooves $a$, substantially as and for the purposes described.

3. The combination, with a washer B, having arms $b$, of a nut C, swiveled upon the said arms, and a retaining-head B', engaged with said arms, whereby the nut is held in its swiveled position upon the arms, substantially as and for the purposes described.

In testimony whereof I sign this specification in the presence of two witnesses.

JOHAN HANSEN.

Witnesses:
MARION A. REEVE,
DELL J. BROWNE.